Dec. 12, 1939.   H. J. LENTZ   2,182,925
ROLLING LEVER VALVE MOTION FOR LOCOMOTIVE AND MARINE STEAM ENGINES
Filed April 26, 1937   4 Sheets-Sheet 1

Inventor:
Hugo Johannes Lentz

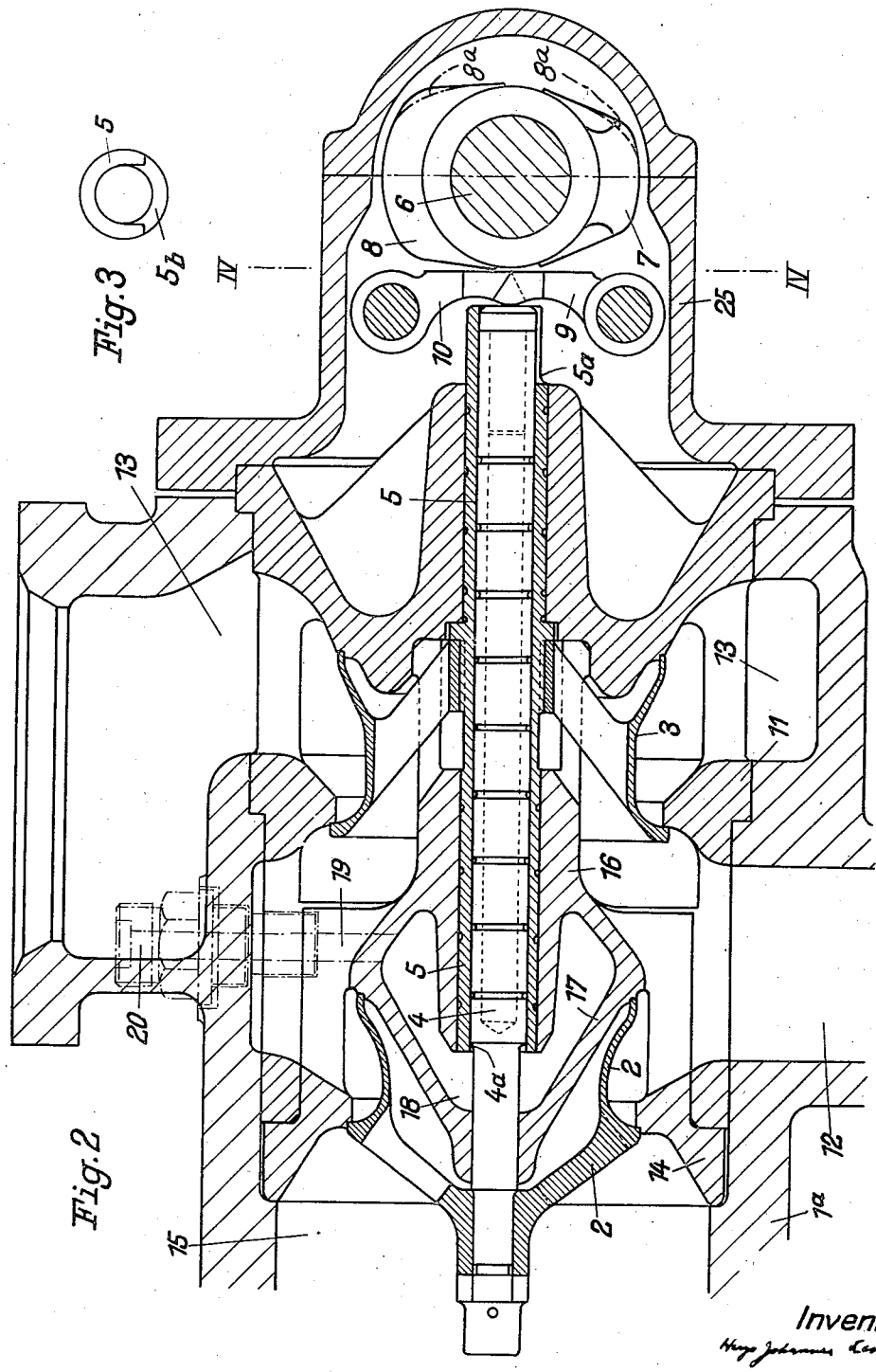

Dec. 12, 1939.    H. J. LENTZ    2,182,925
ROLLING LEVER VALVE MOTION FOR LOCOMOTIVE AND MARINE STEAM ENGINES
Filed April 26, 1937    4 Sheets-Sheet 3

Inventor:

Patented Dec. 12, 1939

2,182,925

UNITED STATES PATENT OFFICE 2,182,925

ROLLING LEVER VALVE MOTION FOR LOCOMOTIVE AND MARINE STEAM ENGINES

Hugo Johannes Lentz, Vienna, Austria

Application April 26, 1937, Serial No. 139,091

5 Claims. (Cl. 121—127)

The invention relates to the particular construction of a rolling lever valve motion for locomotives and marine steam engines, in which the spindles of the admission and exhaust valves on one of the cylinder sides are co-axial the one to the other, and the ends of these spindles project into a space through which the control shaft extends and are driven by an oscillating cam through intermediate levers. The oscillating cams and also the intermediate levers are oppositely directed.

The invention has for its object, to construct the gear elements so that, on the one hand, a rapid lifting of the valves off their seats is obtained and, on the other hand, also the accelerating forces occurring at the rapid opening of the valves, are taken up by large bearing surfaces, so that also at high numbers of revolutions of the engine a steady movement of the valve motion is ensured free from wear. Consequently the bearing faces of the gear cams for admission and exhaust are smaller towards the axis of oscillation of the cam shaft, whereas the rolling faces of the intermediate levers are large near their axis of oscillation and smaller at their free ends. The smaller bearing faces become effective only during the closing of the valves, but the large bearing faces during the lifting of the valves. For controlling the valves a triple rolling lever cam is preferably employed, the admission control finger of which extends towards the axis of oscillation into a narrow rib with pressing off fingers at the end, whereas the exhaust control finger forms a double finger situated at either side of the rib of the admission cam but on the other side of the shaft, the extension of this finger directed towards the axis of oscillation forming also at the end pressing off fingers for slightly lifting the exhaust valves.

Different forms of construction of the invention are illustrated by way of example in the accompanying drawings in which Fig. 1 shows in side elevation the steam cylinder with the housing accommodating the valve gear and the driven rod system.

Fig. 2 is a vertical section through the right side valve housing.

Fig. 3 shows an end view of the hollow exhaust valve spindle.

Figure 1:
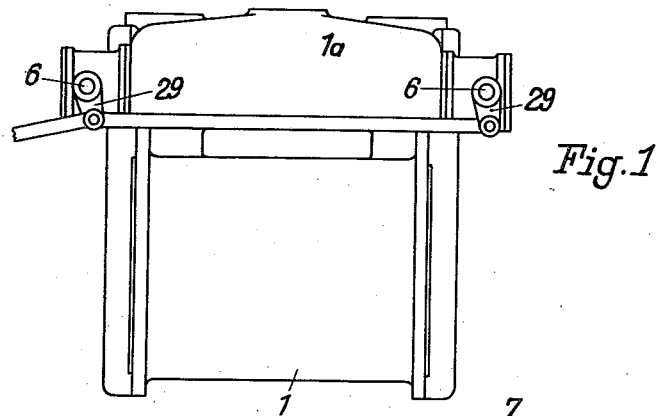
Figure 4:
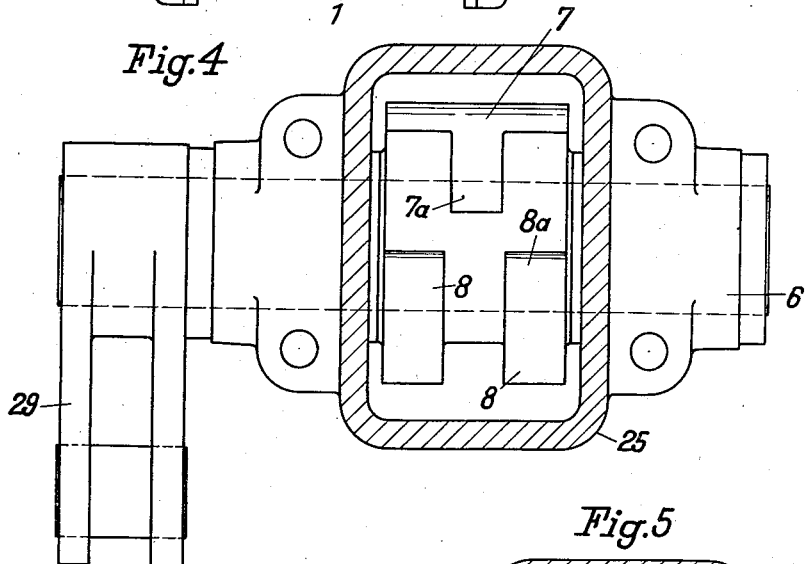
Fig. 4 is a section on line IV—IV of Fig. 2, viewed from the left.
Figure 6:
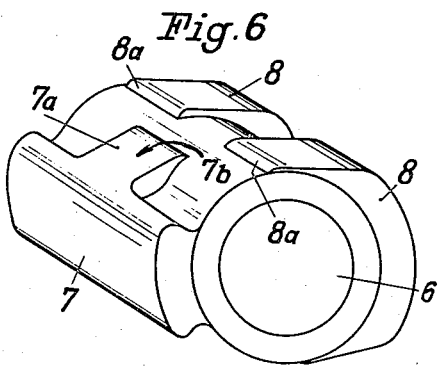
Fig. 6 is a perspective view of the control finger.
Figure 5:
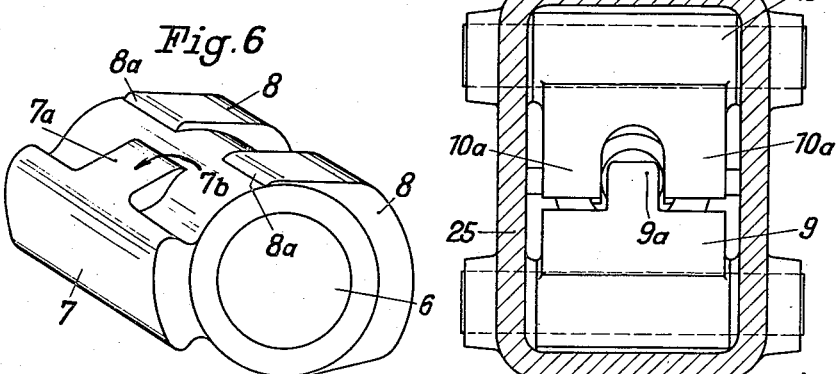
Fig. 5 is a similar section viewed from the right.

1 is the cylinder of a steam engine with a housing 1a extending parallel to the axis of the cylinder and accommodating the valves, gear groups being inserted one from each end of the cylinder, each group consisting of two insert bodies 11 and 14 with built-in admission valve 2 and exhaust valve 3, said valves being actuated by a drive acting upon the valve spindles 4 and 5 mounted the one in the other. The insert bodies 11 and 14 are securely held in the gear housing 1a by the covers 25 closing the housing.

The control gear for the valves of each of the gear groups consists in the present instance of an admission cam 7 fixed on shaft 6 and of an exhaust cam 8 fixed on the same shaft. During the oscillating movement these cams roll on the outer faces of intermediate levers 9 and 10. The end of the intermediate lever 9 for admission touches the end of the valve spindle 4. The end of the intermediate lever 10 for exhaust forms a fork which straddles the end of the intermediate lever 9 and engages the end of the hollow exhaust valve spindle 5. In order that, during the control or valve motion the admission intermediate lever 9 leaves uninfluenced the exhaust spindle 5, the latter has a recess 5a in the side. During the oscillating movement of the cam the admission valve 2 controls the steam inflow from the live steam chamber 15 to the passage 12 leading to the cylinder, and the exhaust valve 3 controls the steam flowing out from the passage 12 to the exhaust collecting chamber 13.

The valves are pressed by steam pressure onto their seats. With this object in view the valve cage 14 for the admission valve 2 is constructed as a hollow body 17, the internal space 18 of which communicates through bores 19 in the valve cage 14 and in the insert body 11 with a hollow fitting 20 screwed into the housing 1a. A pipe not shown in the drawings, is connected to this fitting 20 and admits wet steam from the boiler into the space 18.

The hollow exhaust valve spindle 5 terminates in chamber 18 so that the steam contained therein can act upon it and thereby presses the exhaust valve 3 onto its seat. In order that also the admission valve is closed by steam pressure, the admission valve spindle 4 which extends through the hollow spindle 5 of the exhaust valve 3 is turned off within the hollow space 18 to a smaller diameter. The steam can therefore act upon the free ring-face 4a. This ring face is so dimensioned that, when the steam admission is shut off, the closing steam presses the admission valve 2 upon its seat. If the engine is equipped with the new rolling lever aggregate, live steam chamber 15 acts also to close the admission valve.

The valves are controlled, as already mentioned, by the control cams 7 and 8 which act on the intermediate levers 9 and 10. The control faces of these control elements are constructed, according to the invention, in a special manner so that, on the one hand, a rapid raising of the valves from their seats is obtained and, on the other hand, during their lifting movement at which the accelerating forces have to be met, larger bearing surfaces become effective. Thereby a quiet movement of the poppet valve gear free from wear is attained even with high numbers of revolution of the engine. With this object in view the control cam 7 for the admission valve ends in a rib 7a directed towards the axis of rotation, said rib forming at its free end a small lifting face 7b, which shortly raises the valve when striking against the end of the intermediate lever 9 and thereby lifts the same. During the acceleration period, however, the large surface 7 of the cam becomes effective.

The exhaust cam 8, however, is constructed as a double finger, one on each side of rib 7a, the extension of which, directed towards the axis, having also each one a lifting face 8a, which, before the lifting proper of the exhaust valve begins, at first only slightly raises this valve.

In cooperation with these control cams the intermediate levers 9 and 10 are also shaped so that, during the accelerating period they bear onto the control cam with large faces. The admission intermediate lever 9 ends in a finger 9a which bears against the end of the admission valve spindle and its back cooperates with the rib 7a of the admission cam. During the acceleration period, however, the large cam face 7 cooperates with the large lever face 9.

The intermediate lever 10 for the exhaust cam has, like this cam, two fingers which engage from either side over the finger 7a of the admission cam and act upon the end of the hollow exhaust spindle 5.

This construction of the rolling lever gear is particularly suitable for rapidly running engines, as they can take up the highest accelerating pressures.

This type of the rolling lever valve motion can be employed, as shown in Figs. 1 and 2, in steam engines, in which at each cylinder end a control shaft is arranged for controlling a gear group inserted in the valve housing. The cams may be constructed so that they are symmetrical to a diameter perpendicular to the axis of the valve spindles when in the central position. After the control faces situated on one side of this perpendicular are worn, the other control faces may be rendered fit for employment by reversing the control cam. The control faces arranged on both sides of this diameter may, however, also be differently shaped, so that the control faces on one side are suitable for slowly running engines and those on the other side are suitable for rapidly running engines. The range of application of such control cams is thereby considerably enlarged.

In order to illustrate the different shapes of the control faces, a control cam 8 is illustrated in solid lines in Fig. 2, which is intended for slow running engines. For high speed engines, however, the right hand control face of the control cam has the shape indicated by the dash lines 8a, that is this face is more steeply inclined to the central longitudinal plane of the cam.

Figure 7:
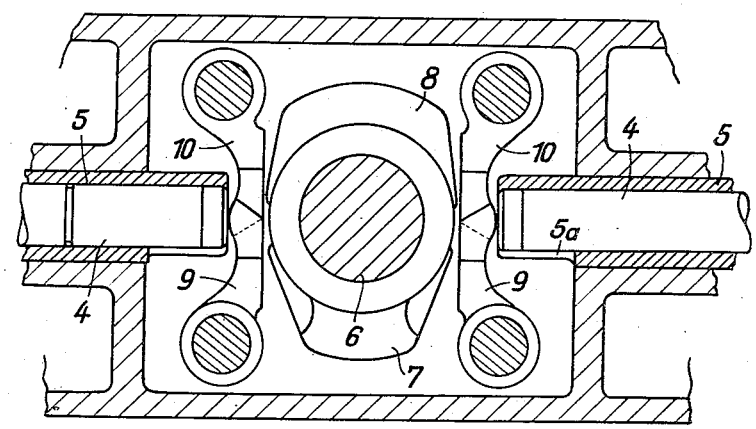
Fig. 7 shows the arrangement of the rolling lever in a gear housing arranged at the middle of the cylinder.

The new rolling lever gear may be used also for such engines, in which, as shown in Fig. 7, the control shaft is arranged in a cam shaft chamber at the middle of the cylinder, and in which the valves on both cylinder sides are controlled by the same control cam.

Figure 8:
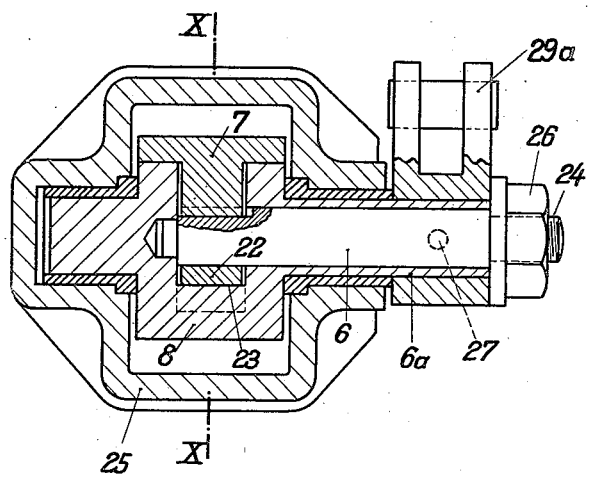
Fig. 8 shows the arrangement of a control finger with mutually adjustable admission and exhaust cams.
Figure 10:
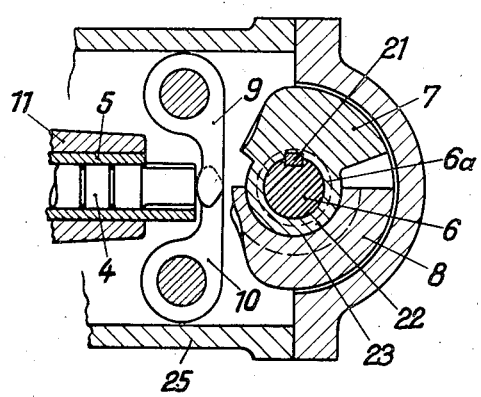
Fig. 10 is a section on line X—X of Fig. 8 or Fig. 9 respectively.

In Fig. 8 another form of construction of the gear is shown in which the gear cam is made in two parts so that the admission control face is adjustable relative to the exhaust control face. The one part 7 which carries the admission control face is fixed on shaft 6 by means of a key 21 (Fig. 10). This part has a cylindrical guide 22 mounted in a cylindrical cavity of the second part 8 which carries the exhaust control face. This part forms a whole with a hollow shaft 6a, through which said shaft 6 extends. The shaft 6 has at its end a screw threaded portion 24, on which a nut 28 is screwed which bears against the end of the hollow shaft 6a or against the driving lever 29a rigidly connected with this shaft. If the control faces for admission and exhaust have been adjusted into the required correct position, this position is secured by tightening nut 28. The driving of both control faces together is then effected by the lever arm 29a at the free end of which a connecting rod is hinged which is connected with the reversing device, not shown.

The two control fingers may be secured in position in that after their adjusting a hole is bored through the two shafts and further through the hub of the driving lever 29a and a pin 27 inserted in this hole as indicated in Fig. 8 in dotted lines.

Figure 9:
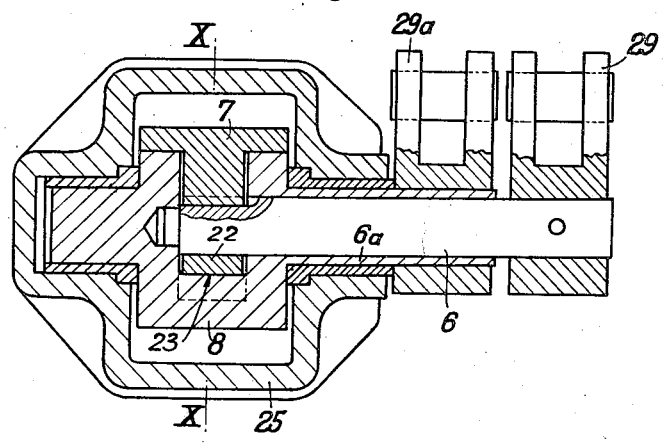
Fig. 9 shows a similar arrangement as Fig. 8 with the difference that each control cam has a separate drive.

The two-part construction of the control cam enables further to separately control admission and exhaust. With this object in view, it is merely necessary according to Fig. 9 to extend shaft 6 and to arrange on the same a second driving lever 29. The driving rods hingedly connected to the lever ends not shown, can then be connected at different oscillation points of the valve gear. Hereby a thorough adaptation of the gear to the actual service conditions is possible.

I claim:

1. A rolling lever valve gear for steam engines comprising in combination with a cylinder, a steam chest parallel to said cylinder, alined admission and exhaust valves in the chest, spindles each carrying one of said valves and slidably guided in said chest, a chamber formed in said chest, the ends of said spindles projecting into said chamber, a control shaft arranged in said chamber, an oscillating member exchangeably fixed on said control shaft, said oscillating member comprising a cam for admission on one side of the axis of the control shaft the outer surface of said cam extending over the whole length of the oscillating member and terminating in the middle in a smaller branch directed towards said axis, and on the opposite side of said axis two smaller cams for the exhaust, and two intermediate levers oscillatably mounted in said chamber and contacting with said cams and said stems.

2. A rolling lever valve gear as specified in claim 1, in which the oscillating member consists of two parts adjustably mounted on the control shaft, the one part carrying the admission control cam and the other part carrying the exhaust control cams, and means for adjusting and fixing the cams.

3. In a rolling lever valve gear as specified in claim 1, a driving member for the admission control cam, and a separate driving member for the exhaust control cam.

4. In a rolling lever valve gear as specified in claim 1, control fingers situated on each side of the central plane of the oscillating member and extending perpendicularly to the valve spindles, said fingers having similarly shaped control faces so that one half of each of said cams can be used as spare finger.

5. A rolling lever valve gear as specified in claim 1, in which the control cams on the one side of the central plane situated perpendicularly to the valve spindles comprise control faces for slow running engines and the cam on the other side of said central plane comprises control faces for rapidly running engines, so that the same control cam can be used for both kinds of engines.

HUGO JOHANNES LENTZ